June 1, 1954
C. E. BRANICK
2,679,896
POWER ACTUATED TIRE BEAD LOOSENING DEVICE
Filed April 18, 1952
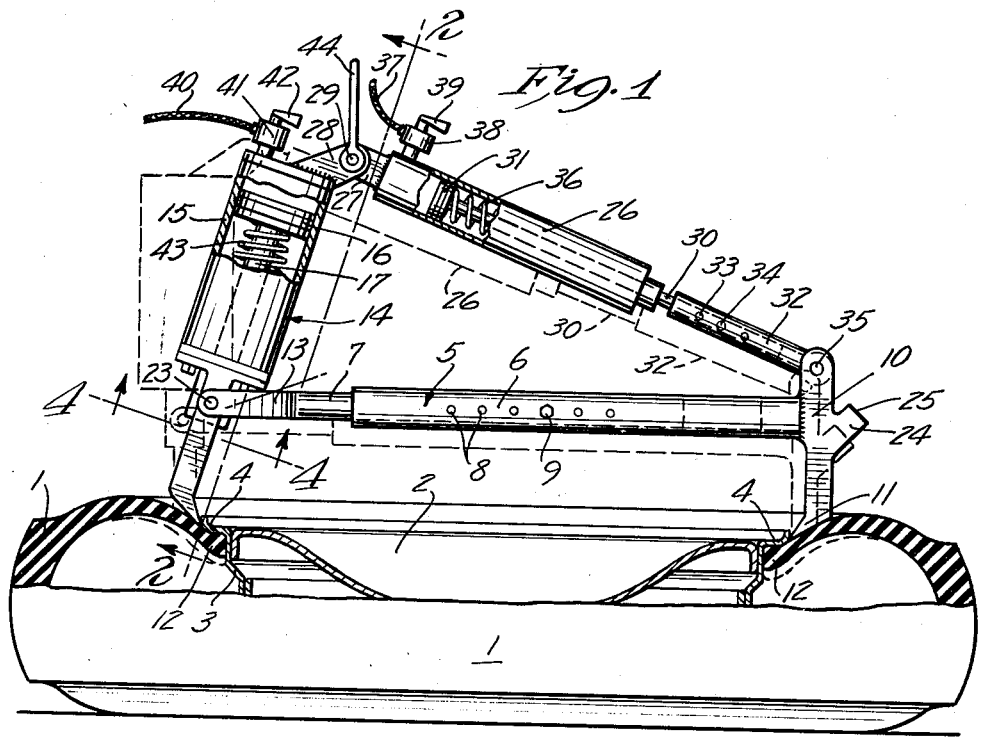
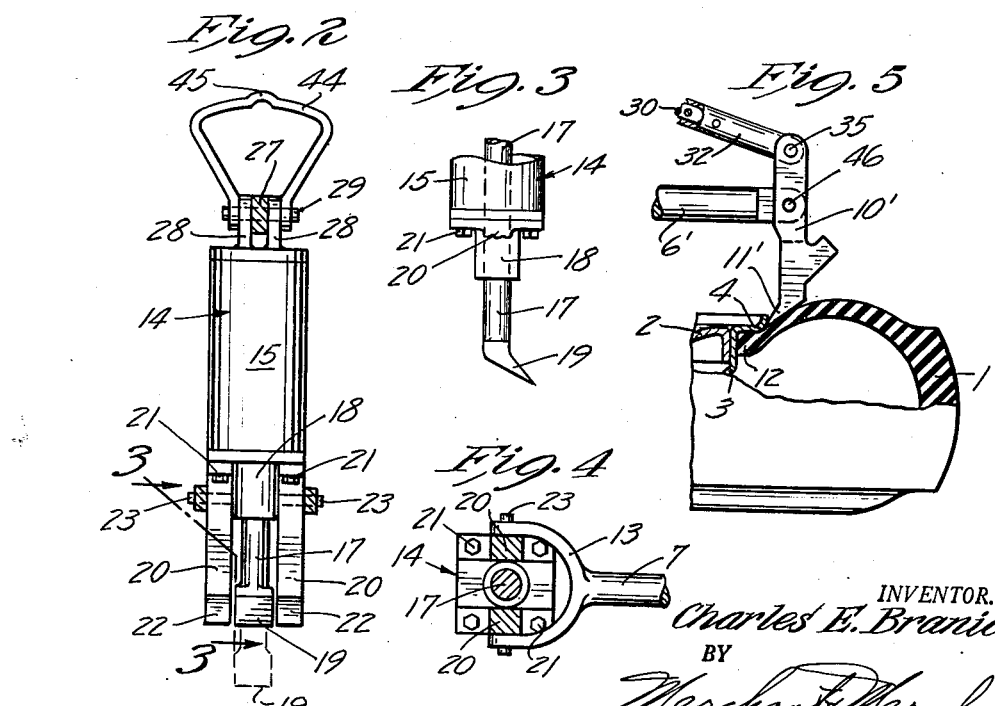
INVENTOR.
Charles E. Branick
BY
Merchant & Merchant
ATTORNEYS Patented June 1, 1954

2,679,896

UNITED STATES PATENT OFFICE 2,679,896

POWER ACTUATED TIRE BEAD LOOSENING DEVICE

Charles E. Branick, Fargo, N. Dak.

Application April 18, 1952, Serial No. 282,941

3 Claims. (Cl. 157—1.17)

My invention relates generally to tire tools and, more specifically, to tools for loosening pneumatic tire casings from the flanged wheel rims on which they are mounted.

More particularly, my present invention is in the nature of a modification on the structure disclosed and claimed in my prior United States Letters Patent No. 2,538,962, issued January 23, 1951, and entitled "Fluid Pressure Operated Tire Bead Loosening Device."

The construction of a substantial number of pneumatic tire-equipped wheels is such that difficulty is experienced in forcing the blades or feet of a tire removing tool, of the type disclosed in my prior patent above referred to, between the rim flange and the bead portion of the tire mounted on the rim. In other words, the rim itself, adjacent a point where it is desired to initiate the breaking of a tire bead loose therefrom, affords no surface which may be used as a base of reaction against the force of entry of the feet of the tire remover between the rim flange and bead. An important object of my invention is, therefore, the provision of a tire loosening device having feet for engaging circumferentially spaced peripheral portions of a rim flange and the adjacent bead portions of a tire, and mechanism for moving said feet inwardly toward each other in a direction tending to separate the tire bead from the rim flange.

Another object of my invention is the provision of a tire loosening device as set forth which is quickly and easily adjusted to accommodate tire-equipped wheels of various diameters.

Another object of my invention is the provision of a tire bead loosening device which consumes a minimum of time and effort in the loosening of a tire casing from a wheel rim.

Another object of my invention is the provision of a tire bead loosening device which is relatively light in weight which is simple and inexpensive to manufacture, and which is rugged in construction and durable in use.

The above and other highly important objects and advantages of my invention will become apparent from the following detailed specification, appended claims and attached drawings.

Referring to the drawings, which illustrate the invention, and in which like characters indicate like parts throughout the several views:

Fig. 1 is a view in side elevation, with some parts broken away and some parts shown in section, of a tire bead loosening device built in accordance with my invention;

Fig. 2 is a transverse section taken substantially on the line 2—2 of Fig. 1;

Fig. 3 is a fragmentary detail as seen from the line 3—3 of Fig. 2;

Fig. 4 is a fragmentary detail partly in bottom plan and partly in section taken substantially on the line 4—4 of Fig. 1; and Fig. 5 is a view corresponding to a portion of Fig. 1, but showing a modified form of the invention.

Referring with greater detail to the drawings, the numeral 1 indicates in its entirety a conventional pneumatic tire of the type used on automotive vehicles. The tire is shown as being mounted on a wheel 2 which is of the disc type having a tire mounting rim 3 and tire bead confining rim flanges 4, one of which is shown. The tire 1 and wheel 2 do not comprise the instant invention and, for the sake of brevity, further detailed description thereof is deemed unnecessary.

In the preferred embodiment of my invention illustrated in Figs. 1 to 4, inclusive, the numeral 5 indicates, in its entirety, a crosstie structure comprising a pair of telescoping sections 6 and 7. The crosstie section 6 is preferably made from tubular material, the section 7 being slidably received therein. The outer section 6 is provided with a plurality of longitudinally spaced transverse apertures 8 that extend through diametrically opposite portions thereof. A locking pin or bolt 9 is adapted to be passed through a selected aperture 8 and a single aperture, not shown, extending transversely through the section 7, which, under relative sliding movements of the sections 6 and 7, is alignable with a selected one of the apertures 8, whereby to vary the length of the crosstie 5. A depending leg element 10 is welded or otherwise rigidly secured to the outer end of the crosstie section 6 and is provided at its lower end with an inturned foot 11 that is adapted to be inserted between the rim flange 4 and the bead of the tire 1, said bead being indicated at 12.

At its outer end, the crosstie section 7 is formed to provide a yoke 13 which has pivotal connection with a power head indicated in its entirety by the numeral 14. The power head 14 comprises a fluid pressure cylinder 15 having slidably mounted therein a piston 16 to which is rigidly secured a plunger rod 17 that projects axially outwardly of the lower end portion 18 of the cylinder terminating in a laterally inwardly extending foot 19 similar to the foot 11 on the leg element 10. A pair of laterally spaced legs 20 are rigidly secured at their upper ends by bolts or the like 21 to the lower end of the cylinder 15 and extend downwardly therefrom in spaced parallel relationship, one on either side of the plunger 17. The legs 20 are formed at their lower ends with inturned feet 22 extending generally in the direction of the foot 11 on the leg element 10. A pair of axially aligned trunnions 23 extend laterally outwardly from the legs 20 and are journaled in opposite end portions of the yoke 13, whereby the power head 14 is pivotally mounted on the crosstie. It will be noted that the axis of the aligned trunnions 23 extends in a direction transversely of the crosstie 5 and of the leg element 10, so that pivotal movements of the power head 14 with respect to the crosstie 15 will impart movement of the feet 22 generally toward and away from the foot 11 on the leg element 10. The feet 22 are substantially diametrically opposite to the foot 11. For this reason, when the feet 11 and 22 are placed on a tire to be removed from the rim, as indicated by full lines in Fig. 1, the foot 11 will provide a base of reaction for the feet 22 when the power head 14 is moved to its dotted line position of Fig. 1. In fact, the foot 11 on the leg element 10 and the feet 22 on the legs 20 all tend to move radially inwardly and wedge themselves between the rim flange 4 and the tire bead 12 when the power head 14 is moved to its dotted line position of Fig. 1. In order to insure the foot 11 against slipping out of engagement with the rim flange 4 when the device is initially applied to the rim and tire, I provide a lug 24 integrally formed with the leg 10, said lug having an end 25 disposed at substantially right angles to the direction of movement of the foot 11. The operator, by tapping on the surface 25 with a hammer, will force the foot 11 partially between the flange 4 and the tire bead 12 sufficiently to assure a firm footing therein.

Means for moving the power head 14 in a direction to cause the feet 11 and 22 to wedge themselves between the rim flange 4 and the tire bead 12, comprises extendable and retractable mechanism including a fluid pressure cylinder 26 having at one end a tongue 27 which is pivotally mounted between a pair of ears 28 welded or otherwise rigidly secured to the upper end of the cylinder 15. As shown in Figs. 1 and 2, a pivot pin 29 extends through aligned apertures in the tongue 27 and ears 28 and projects axially outwardly from the opposite sides of the ears 28. The above mentioned means further includes a plunger rod 30 slidably mounted in the free end of the cylinder 26 and secured at its inner end to a piston 31 contained within the cylinder 26. The outer end of the plunger rod 30 is telescoped within a tubular member 32 and is provided with a transverse aperture, not shown, but which may be assumed to be alignable with a selected one of a plurality of apertures 33 in the tubular member 32. A locking pin or bolt 34 extends through one of the apertures 33 and the aperture in the plunger rod 30 to lock the plunger rod in desired set relationship with the tubular member 32. The outer end of the tubular member 32 is pivotally secured to the upper end of the leg 10, as indicated at 35.

The power head 14 is normally yieldingly biased toward a spread apart position of the feet 11 and 22 by a coil compression spring 36 interposed between the piston 31 and the open end of the cylinder 26. Fluid, preferably air, under pressure, is admitted to the closed upper end of the cylinder 26 from a suitable source, not shown, through a conduit 37 and a three-way valve 38 connected to the cylinder. The valve 38 may be any one of a number of conventional three-way valve structures, but preferably is of the type disclosed in my prior United States Patent No. 2,310,892. The valve 38 is provided with an operating handle 39 which, when moved to one position, will admit air under pressure to the cylinder 36 to cause movement of the power head 14 toward its dotted line position of Fig. 1. Movement of the handle 39 to a second position will cut off supply of air to the cylinder 26 and cause communication of the interior of the cylinder with atmosphere. Normally, when the interior of the cylinder 26 is open to atmosphere, the spring 36 will cause movement of the feet 22 in a direction away from the foot 11.

In the loosening of the bead 12, after the feet 11 and 22 have been wedged between the bead 12 and the flange 4, air under pressure is introduced to the upper closed end of the cylinder 15 from the fluid source, not shown, through a conduit 40 and a second three-way valve 41 which is connected to the cylinder 15 and which is provided with an operating handle 42. Pressure of air introduced to the cylinder 15 above the piston 16 will cause downward movement of the piston 16 and the plunger rod 17 sufficient to cause the foot 19 thereof to force the side wall of the tire 1 and the bead 12 downwardly toward the axial center of the rim 3. The normal rigidity of the bead 12 generally causes the bead to be loosened about its entire circumference. During the downward movement of the plunger 17, the cylinder 15 is held against upward movement relative to the tire and rim by engagement of the feet 22 with the inner surface of the flanges 4, this latter operation being similar to that disclosed in my prior Patent No. 2,538,962. A coil compression spring 43 exerts a yielding bias against the piston 16 to retract the plunger 17 to its full line position of Fig. 2 when the valve 41 is manipulated to open the interior of the cylinder 15 to atmosphere.

As above indicated, the construction of the crosstie 5 permits a substantial variation in the distance between the leg element 10 and the power head 14. When such adjustment is extreme, similar adjustments should be made in the effective length of the plunger rod 30 so that the power head 14 is not swung to an angle with respect to the leg 10 wherein the efficiency of the device is impaired, hence the adjustability between the plunger rod 30 and the tubular member 32.

I further provide handle means whereby my novel device may be carried from one part of the shop to the other, said handle means being indicated at 44. As shown in Figs. 1 and 2, the handle 44 is pivotally mounted on the outwardly projecting end portions of the pivot pin 29 and is provided at its center with an offset portion 45 for the reception of a hook or ring, not shown, but which may be attached to a supporting device similar to that shown in my above-mentioned prior Patent No. 2,538,962. However, for all practical purposes, the device is sufficiently light in weight so as to be easily transported by hand.

In the modified form of the invention shown in Fig. 5, a leg element 10' is shown as being pivotally secured to the outer end of a crosstie section 6' for pivotal movements about the axis of a pivot pin 46, said axis being parallel to the axis of pivotal movement between the power head 14 and the crosstie. With this arrangement, pivotal movement is imparted both to the leg 10' and to the power head 14 in a direction to cause the foot 11' and the feet 22 to move toward each other. With the exception of the pivotal connection between the leg 10' and the crosstie member 6', all parts of the modified structure are identical to those of the preferred form illustrated in Figs. 1 to 4, inclusive.

My invention has been thoroughly tested and found to be completely satisfactory for the accomplishment of the objectives set forth; and while I have shown and described a commercial embodiment and one modification of my improved tire bead loosening device, it will be understood that the same is capable of further modification without departure from the spirit and scope of the invention as defined in the claims.

What I claim is:

1. A tire bead loosening device comprising a crosstie, a power head element and a leg element mounted on opposite ends of said crosstie for pivotal movements of one of said elements about an axis extending in a direction transversely of the crosstie and the other of said elements, said elements being provided at their lower ends with opposed pneumatic tire-engaging feet for insertion between diametrically opposed portions of the rim flange of a pneumatic tire-equipped wheel and the bead of a tire casing mounted thereon, a power-operated tire-engaging member mounted in the power head element for extending and retracting movements toward and away from the side wall of said tire casing; and mechanism for imparting pivotal movements to said one of the elements in a direction to move one of said feet generally toward the other thereof, said mechanism comprising a fluid pressure cylinder pivotally connected to one of said elements in spaced relation to said crosstie, an extendable and contractable piston-equipped plunger rod mounted in said cylinder and having its outer end pivotally connected to the other of said elements in spaced relation to said crosstie, and means including a valve for connecting said cylinder to a source of fluid under pressure.

2. The structure defined in claim 1 in which both the cross-tie and said extensible and contractable plunger rod includes telescoping sections, and in further combination with means for positively locking said sections in adjusted set positions.

3. A tire bead loosening device comprising a crosstie, a leg element rigidly secured to one end of the crosstie, a power head, means mounting said power head to the opposite end of the crosstie for swinging movements about an axis extending in a direction transversely of said crosstie and leg element, said power head including a leg extending longitudinally thereof, said leg and leg element being provided at their lower ends with opposed pneumatic tire-engaging feet for insertion between diametrically opposed portions of the rim flange of a pneumatic tire-equipped wheel and the bead of a tire casing mounted thereon, a power-operated tire-engaging member mounted in the power head for extending and retracting movements in a direction parallel to said leg toward and away from the side wall of said tire casing, and mechanism for imparting pivotal movements to said power head in a direction to move the foot associated therewith generally toward the foot on said leg element, said mechanism comprising a fluid pressure cylinder pivotally connected to one of said elements in spaced relation to said crosstie, an extendable and retractable piston-equipped plunger rod mounted in said cylinder and having its outer end pivotally connected to the other of said elements in spaced relation to said crosstie, and means including a valve for connecting said cylinder to a source of fluid under pressure.

References Cited in the file of this patent

UNITED STATES PATENTS

| Number | Name | Date |
|---|---|---|
| 2,367,638 | McCulloch | Jan. 16, 1945 |
| 2,389,526 | Maulding | Nov. 20, 1945 |
| 2,495,117 | McCollister | Jan. 17, 1950 |
| 2,520,330 | Northrup et al. | Aug. 29, 1950 |
| 2,533,413 | Williams | Dec. 12, 1950 |
| 2,581,086 | Edenfield et al. | Jan. 1, 1952 |
| 2,606,602 | Manupello | Aug. 12, 1952 |
| 2,619,158 | Kohn | Nov. 25, 1952 |